United States Patent [19]

Mahoney

[11] Patent Number: 4,610,177
[45] Date of Patent: Sep. 9, 1986

[54] PRESELECTED MULTIRATIO TRANSMISSION

[75] Inventor: John E. Mahoney, West Bloomfield, Mich.

[73] Assignee: General Motors Corporation, Detroit, Mich.

[21] Appl. No.: 705,206

[22] Filed: Feb. 25, 1985

[51] Int. Cl.[4] .............................................. F16H 3/08
[52] U.S. Cl. ........................................ 74/330; 74/359
[58] Field of Search ................ 74/329, 330, 331, 359, 74/360

[56] References Cited

U.S. PATENT DOCUMENTS

| 2,972,899 | 2/1961 | Wiggermann | 74/360 X |
| 4,513,631 | 4/1985 | Koivunen | 74/360 |
| 4,519,484 | 5/1985 | Nagaoka et al. | 74/330 X |

FOREIGN PATENT DOCUMENTS

| 0090674 | 5/1983 | European Pat. Off. | |
| 2452739 | 5/1976 | Fed. Rep. of Germany | 74/360 |
| 2644113 | 4/1978 | Fed. Rep. of Germany | 74/360 |

*Primary Examiner*—Lawrence Staab
*Assistant Examiner*—Martin G. Belisario
*Attorney, Agent, or Firm*—Donald F. Scherer

[57] ABSTRACT

A preselected multiratio transmission has three selectively engageable input friction clutches and three selectively engageable synchronized mechanical ratio clutches. The friction clutches are connected with respective input shafts each of which shafts has two input ratio gears rotatably mounted thereon and one of the synchronized clutches connected therewith. Each synchronized clutch is operable to control two gear ratios. A countershaft has a plurality of output ratio gears connected therewith, which gears mesh with respective ones of the input ratio gears. The countershaft is drivingly connected with a transmission output means. The synchronized clutches are operated to preselect a drive ratio which is then completed by the engagement of the friction clutch associated therewith and the substantially simultaneous disengagement of either of the other friction clutches which may have been engaged. The judicious selection of friction clutches and synchronized clutches permits the transmission to be operated in a conventional step ratio pattern or in a plurality of skip ratio patterns.

1 Claim, 1 Drawing Figure

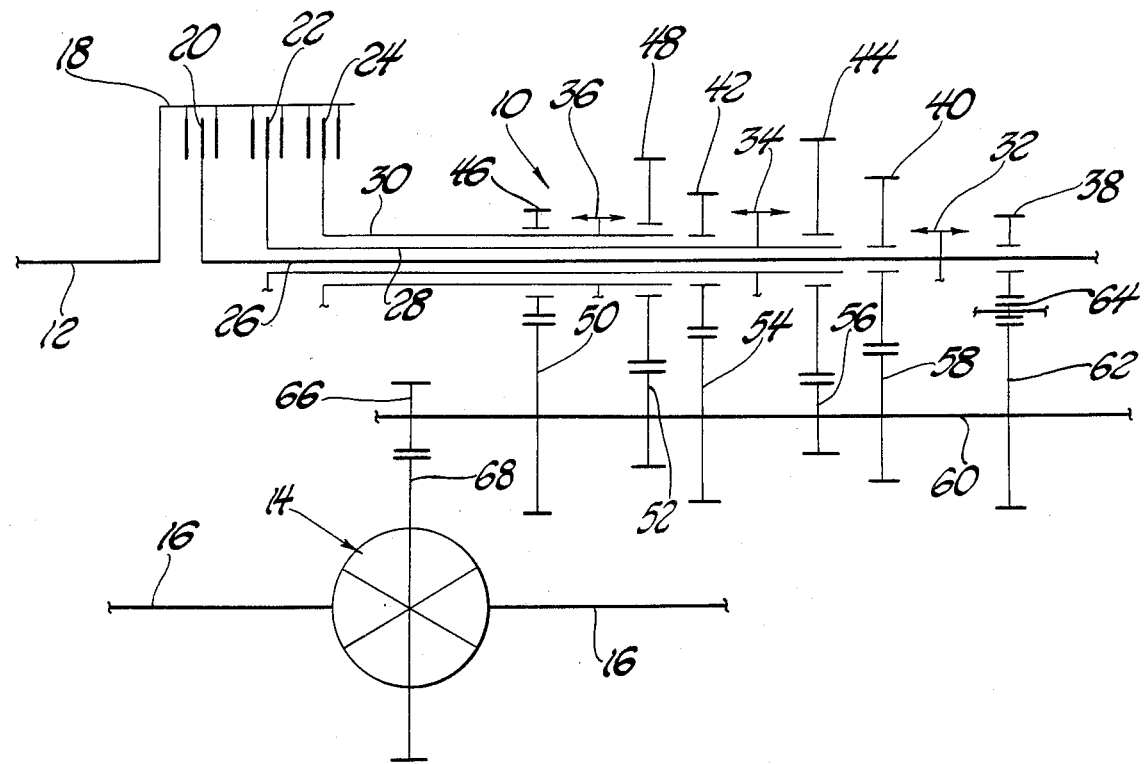

PRESELECTED MULTIRATIO TRANSMISSION

BACKGROUND OF THE INVENTION

This invention relates to countershaft type transmissions and more particularly to preselected ratio countershaft transmissions.

Most preselected ratio transmissions do not permit single ratio skip shifting. That is, a direct upshift from first to third or a direct downshift from first to third cannot be accomplished. There is known, however, one transmission arrangement of the preselected type which will permit direct single ratio skip shifting. This transmission is described in U.S. patent application Ser. No. 504,794, filed June 16, 1983 now U.S. Pat. No. 4,513,631, issued Apr. 30, 1985 in the name of Koivunen and assigned to the assignee of the present invention. The structure disclosed in the Koivunen device, utilizes multiples of one ratio, such as first and second, disposed on separate input shafts. This structure, therefore, requires additional ratio gear sets which are not required by the present invention.

SUMMARY OF THE INVENTION

The present invention utilizes an additional input clutch and shaft and eliminates the additional ratio gear sets, found in the prior art, to provide a preselected multiratio transmission having single ratio skip shifting.

It is an object of this invention to provide an improved preselected multiratio transmission having three selectively engageable friction clutches and three selectively engageable mechanical clutches disposed between the transmission input drive means and the ratio gearing for selectively establishing single step ratio gear changing and skip ratio gear changing between the transmission input and output drive means.

It is another object of this invention to provide an improved preselected ratio transmission having a drive shaft and a driven shaft wherein three selectively engageable input friction clutches are operatively connected between the drive shaft and three transmission input shafts, each of which is drivingly connected with a synchronized mechanical clutch and rotatably supports two input ratio gears, and wherein each input ratio gear meshes with respective output ratio gears which are drivingly connected with the driven shaft and also wherein selective engagement and disengagement of combinations of the friction and mechanical clutches provides normal step ratio operation and at least single skip ratio operation of the transmission.

DESCRIPTION OF THE DRAWING

The drawing is a schematic representation of a transmission incorporating the present invention.

DESCRIPTION OF THE PREFERRED EMBODIMENT

Referring to the drawing, there is seen a transmission generally designated 10 having a drive shaft 12, a differential 14 and a pair of driven shafts 16. The drive shaft 12 is connected to a hub member 18 which incorporates components of three selectively engageable conventional friction input clutches 20, 22 and 24. The input clutches 20, 22 and 24 are preferably fluid-operated and may be controlled in a well-known manner. The clutches 20, 22 and 24 can also, as is well-known, be mechanically or electrically operated. Input clutches 20, 22 and 24 are respectively connected to input shafts 26, 28 and 30 which, in turn, are connected to respectively mechanical clutches 32, 34 and 36. The mechanical clutches 32, 34 and 36 are preferably of the synchronized type, however, dog-type clutches can be utilized.

Input shaft 26 rotatably supports a reverse ratio gear 38 and a third ratio gear 40. Input shaft 28 rotatably supports a second ratio gear 42 and a fifth ratio gear 44. Input shaft 30 rotatably supports a first ratio gear 46 and a fourth ratio gear 48. Gears 38 and 40 can be selectively connected to rotate in unison with the input shaft 26 through the manipulation of clutch 32. Gears 42 and 44 can be selectively connected with the input shaft 28 through the operation of mechanical clutch 34 and gears 46 and 48 can be selectively connected with the input shaft 30 through the manipulation of mechanical clutch 36. The ratio gears residing on the same input shaft, for example, 46 and 48, cannot be engaged simultaneously since the mechanical clutch 36 must be engaged with one or the other of the ratio gears 46 or 48.

The ratio gears 46, 48, 42, 44 and 40 respectively mesh with output gears 50, 52, 54, 56 and 58. The output ratio gears 50–58 are drivingly connected with a transmission output shaft 60. Also connected with the transmission output shaft 60 is a reverse output gear 62 which meshes with an idler gear 64 which, in turn, meshes with the input reverse ratio gear 38. The transmission output shaft 60 is drivingly connected to the differential 14 through a pair of meshing gears 66 and 68.

With all of the input clutches 20, 22 and 24 disengaged, the operator can manipulate mechanical clutch 36 or 32 to engage either first ratio gear 46 or reverse ratio gear 38. If first ratio gear 46 is engaged, input friction clutch 24 can then be engaged to initiate movement of the vehicle through the rotation of driven shafts 16. While the first ratio is operable, mechanical clutch 34 can engage second ratio gear 42. Input shaft 28 is free to rotate relative to the input hub 18 because the input clutch 22 is disengaged. To interchange first ratio and second ratio, input clutch 24 undergoes controlled disengagement while input clutch 22 undergoes controlled engagement. While the transmission is in second gear, the mechanical clutch 32 can be manipulated to engage the third ratio gear 40.

It should be noted at this time, that the mechanical clutch 36 can either remain in engagement with first ratio gear 46 of be shifted into engagement with fourth ratio gear 48. If a second to third interchange is desired, input clutch 22 is controlled to disengage while input clutch 20 is controlled to engage. It should be appreciated that from second gear, either fourth gear or first gear can be engaged if a third gear ratio is not desired. To interchange fourth gear and third gear, input clutch 20 is controlled to disengage while the input clutch 24 is controlled to engage. It should be noted that mechanical clutch 36 would have been manipulated to preselect the fourth gear ratio.

When input clutch 22 is disengaged, the mechanical clutch 34 can be manipulated to preselect the fifth ratio gear 44. The fifth gear ratio can be engaged by selectively controlling the engagement of input clutch 22 and controlling the disengagement of input clutch 24. When the fifth gear ratio is being utilized, it should be appreciated that the transmission can be downshifted from fifth gear to either fourth gear, third gear or first gear. When the fourth ratio has been engaged in the transmission, a downshift to either third gear of second gear can be accomplished. When the third gear has been established, a downshift to either second gear of first gear can be achieved or, as previously discussed, upshifted to either fourth gear of fifth gear.

Gear ratio interchanges between first and fourth, second and fifth or third and reverse cannot be preselected. Shifting between first and reverse can be accomplished by engaging clutch 36 to first ratio gear 46 and clutch 32 to the reverse ratio gear 38 and then selectively interchanging the input clutches 24 and 20. Assuming the clutches 24 and 20 are designed to have the capacity to transmit the required torques, rocking of the vehicle can be accomplished.

Most importantly, from the foregoing description, it should be appreciated that single skip ratio shifting is obtained with the preselected transmission herein described. That is, a first-third shift interchange can be accomplished; a second-fourth shift interchange can be accomplished; and a third-fifth shift interchange can be accomplished. The prior art, with the exception of Koivunen, have not permitted such operation.

The embodiments of the invention in which an exclusive property or privilege is claimed are defined as follows:

1. A multistep ratio power transmission comprising a drive shaft; a driven shaft; three selectively engageable friction clutch means operatively connected with said drive shaft; three transmission input shafts each connected with respective friction clutch means; three synchronizer clutch means connected with respective ones of said three transmission input shafts; a plurality of gear train means operatively connected with said output shaft for selectively providing a plurality of forward step ratios and a reverse ratio including two ratio gears on each transmission input shaft and being selectively connectible therewith by respective ones of the synchronizer clutch means, and an output ratio gear meshing with each ratio gear; and each of said synchronizer clutch means being operable to selectively connect a pair of gear train means with the respective friction clutch means, at least two of said pairs of gear train means providing forward drive ratio with each pair controlled by the same synchronizer clutch means providing forward drive ratios which are separated by three ratio steps.

* * * * *